United States Patent Office 3,127,542
Patented Mar. 31, 1964

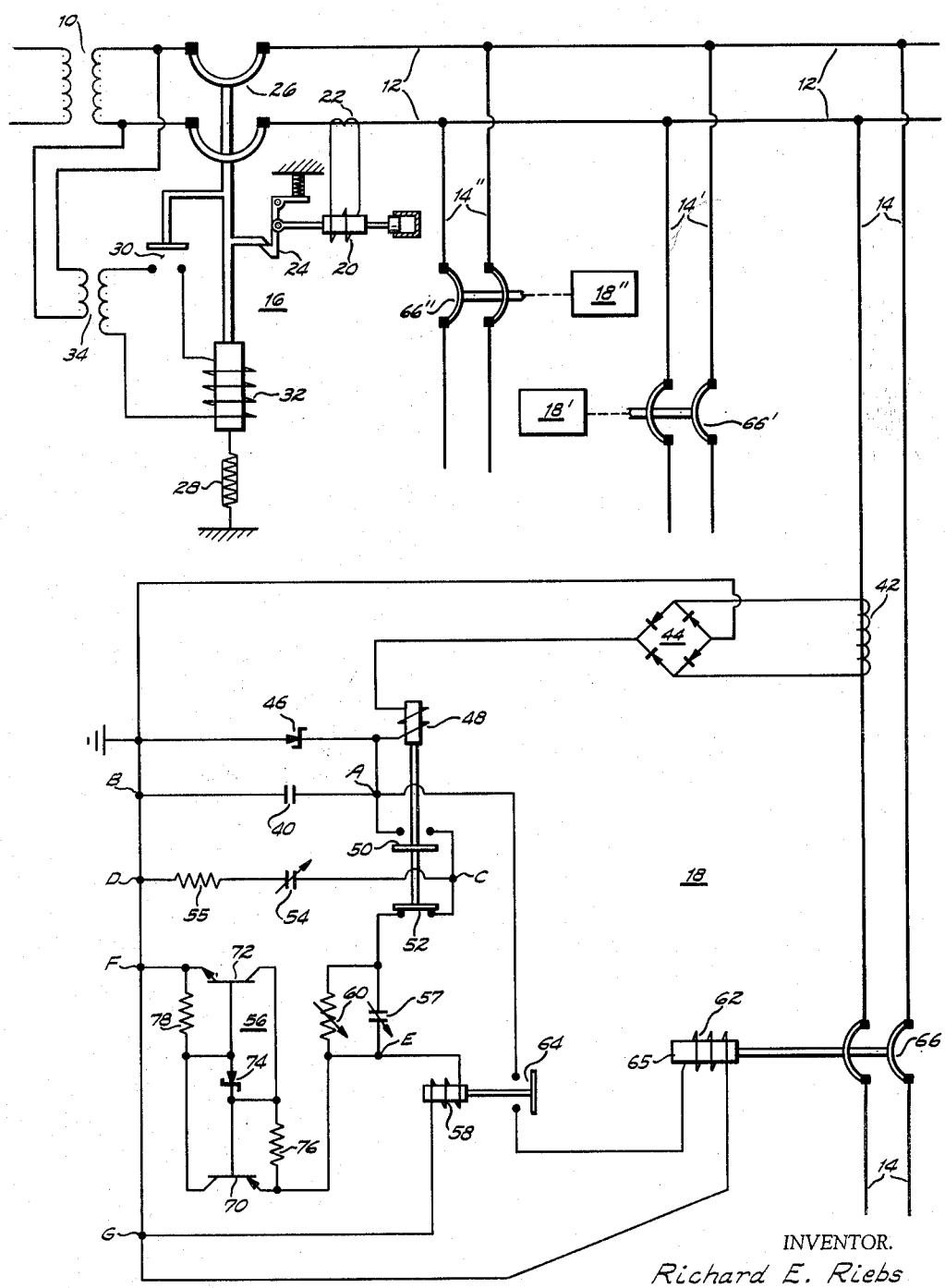

3,127,542
AUTOMATIC RECLOSING BREAKER SYSTEM INCLUDING A REPEATING CIRCUIT INTERRUPTER AND SECTIONALIZER SWITCHES
Richard E. Riebs, Hales Corners, Wis., assignor to McGraw-Edison Company, Milwaukee, Wis., a corporation of Delaware
Filed June 8, 1959, Ser. No. 818,780
16 Claims. (Cl. 317—22)

This invention relates to automatic sectionalizing switches and more particularly to an automatic sectionalizing switch control circuit.

It is common practice in distribution systems to utilize a repeating circuit interrupter connected in series with the main distribution line and located adjacent the source of power and sectionalizer switches disposed in feeder lines radiating from the main line. Because the majority of faults in such systems are temporary in nature and will clear in a relatively short time, it is common to adjust the repeating circuit interrupter to execute, upon the occurrence of a fault, a series of rapidly successive opening and reclosing operations, during which time the sectionalizer contacts remain closed to prevent unnecessary operation thereof. If the fault has not cleared after a predetermined number of such opening and reclosing operations, usually three, it is considered permanent, in which case it should be isolated from the source. If the fault is in one of the feeder lines its sectionalizer switch will open subsequent to the third opening operation of the circuit interrupter, thereby isolating the fault in the feeder line. For this purpose, sectionalizer switches are provided with fault integrating means which count the number of fault current impulses and then operate the sectionalizer switch opening means whereupon the faulted feeder line will be isolated from the main line while the circuit to the remaining feeder lines remains intact. This opening of the sectionalizer switch contact takes place while the repeating circuit interrupter is open, so that the setcionalizing switch is not required to have interrupting capacity. After the sectionalizing switch in the faulted section has opened the repeating circuit interrupter again recloses restoring service to the non-faulted feeder lines. If the permanent fault exists in the main line, however, the sectionalizing switches will remain inactive while the repeating circuit interrupter cycles to lockout, so that when service is restored in the main line the feeder lines will be immediately energized.

Prior art sectionalizer switches generally utilize integrators of the hydraulic or clockwork type. Hydraulic integrating devices do not prove entirely satisfactory because the viscosity of the hydraulic fluid changes with temperature, thereby making them temperature sensitive. In addition, hydraulic integrators cannot be easily adapted to count low current faults of a very short duration and they do not readily allow the retention time of the signals being integrated to be accurately controlled. Clockwork type integrators have generally proven too expensive for use in this application.

It is an object of the invention to provide an electronic control circuit for sectionalizer switches.

It is a general object of the invention to provide a control circuit for sectionalizer switches which is sensitive to low current short duration faults, is not temperature responsive, and which is relatively inexpensive.

It is a further object of the invention to provide an integrating circuit for sectionalizer switches in which the retention time may be accurately adjusted.

These and other objects of the invention will become apparent from the detailed description thereof, taken in view of the drawing which shows an integrating circuit for a sectionalizer switch according to the instant invention.

In general terms, the invention comprises a control circuit for automatic sectionalizer switches having signal means for producing an electrical signal each time a predetermined condition occurs in the system to be protected and electrical signal memory means connected to said signal means for opening the main switch upon the receipt of a predetermined number of such signals. The electrical signal means includes a source of energy while the signal memory means includes energy storage means and energy responsive means for opening said main switch when the energy on the storage means exceeds a predetermined value. The signal means also includes condition responsive means for transferring a quantity of energy from the energy source to the energy storage means each time the circuit condition occurs.

More specifically the control circuit includes an energy source and first and second energy storage means, condition responsive means connected to the system and operable to transfer a quantity of energy from said source to the first energy storage means upon the appearance of a predetermined condition in the system and also operable to transfer a portion of the energy stored in the first energy storage means to the second when said condition disappears and switch actuating means operable when the difference in the energy stored on the first and second energy storage means falls below a predetermined value. The quantity of energy transferred from the system to the first energy storage means is governed by the energy previously stored thereon and the portion of energy transferred from the first energy storage means to the second is governed by the difference in the energy levels therebetween.

In the preferred embodiment of the invention the first and second energy storage means comprise capacitors while the source of energy may be a storage capacitor adapted to be charged from the system. The condition responsive means comprises relay means coupled to the system and adapted to connect the first capacitor to the energy source upon the occurrence of the circuit condition and to connect the first and second capacitors upon the disappearance of this condition. The switch actuating means includes discharge means in series with the second capacitor and operable to complete the charging circuit thereto when the difference between the voltages on the two capacitors exceeds its discharge potential and electroresponsive switch opening means shunting the discharge means so that it conducts the flow of charge between the capacitors to open the main switch when the voltage difference falls below said discharge potential. The invention may also include leakage means connected to the capacitors for leaking the charge thereon if the number of operations is insufficient to cause operation.

In operation the sectionalizer switch according to the invention is disposed in a feeder line radiating from a main line which is protected by a repeating circuit interrupter. The energy source capacitor is normally maintained in charged condition by current flowing in the feeder line to which it is coupled by means of a current transformer and rectifier. By placing an overcurrent relay in the charging circuit to the energy source capacitor, the device can be made to execute an integrating operation each time the feeder line current exceeds a predetermined minimum value. The first and second capacitors are normally connected in parallel by normally closed contacts of the overcurrent relay, while normally open contacts thereof separate the first capacitor from the energy source capacitor. Should an overcurrent occur in the feeder line, the current responsive relay closes its normally open contacts to place the first energy storage capacitor in parallel with the charged energy source capacitor whereupon a predetermined portion of the latter's charge is placed upon the former. After a time delay the circuit interrupter in the main line opens as a result of this overcurrent, thereby de-energizing the feeder line and causing the overcurrent relay to return to its original position. As a result, the first energy storage capacitor and the energy source capacitor are disconnected and the first and second energy storage capacitors are placed in parallel causing the charge on the first energy storage capacitor to be redistributed between the two. This places an instantaneous voltage across the series connected discharge means which is equal to the initial difference in voltage between the two energy storage capacitors. If this difference exceeds the breakdown potential of the discharge device, it will conduct. If the fault has not cleared after a predetermined number of such operations, the charge on the second energy storage capacitor will build up to a point where the voltage difference between the two storage capacitors is not sufficient to cause operation of the discharge means. Upon this event, the charging current to the second energy storage capacitor will flow through the coil of the switch opening relay connected in parallel with the discharge device, whereby the sectionalizer switch is operated. If the fault clears, however, prior to the opening of the main switch, the charge on each of the energy storage capacitors will leak off through the leakage resistor.

Referring to the drawing in greater detail, an electrical distribution system is illustrated having a source of power symbolized by transformer 10, a main line section 12 in series with the source of power and a plurality of feeder lines 14, 14' and 14" radiating from the main line. A circuit interrupter 16, of the self-reclosing type, is disposed in the main line 12 adjacent the source of power 10 while a sectionalizer switch 18, 18' and 18", according to the instant invention, is disposed in each of the feeder lines 14, 14' and 14" respectively, adjacent their junctions with the main distribution line 12. Because each of the sectionalizer switches 18, 18' and 18" is identical, only 18 is shown in detail for the sake of simplicity, the others merely being shown in symbolic form.

Upon occurrence of a fault in the main line 12 or one of the feeder lines 14, 14' or 14", the trip coil 20 of repeating circuit interrupter 16, senses the fault through current transformer 22, which couples it to the system 12. This actuates trip coil 20, after a time delay, to release latch 24 which allows the main switch 26 to open under the influence of an opening spring 28. When the main switch 26 reaches its fully open position, auxiliary contacts 30 couple the reclosing coil 32 to the source side of the main distribution line 12 through step-down transformer 34, so that the main switch 26 is again reclosed. If the fault has cleared during this opening and reclosing cycle, the main switch 26 will remain closed. If, however, the fault has not cleared during this interval, there follows a predetermined number of successive opening and closing operations followed by the locking open of the main switch 26 by a lockout means which is not shown but which is well known in the art.

Referring now to the sectionalizer switch 18, it is shown to include an energy source capacitor 40 coupled to the feeder line 14 by means of a current transformer 42 and a bridge type rectifier 44. In this manner, the rectified current in the secondary of current transformer 42 maintains the energy source capacitor 40 fully charged. In order to limit the voltage across the energy storage capacitor 40 to the desired value, it is shunted by a Zener diode 46 which bypasses the charging current around said capacitor when the latter is fully charged.

The operating coil of an overcurrent relay 48 is connected in series with the charging circuit of the energy source capacitor 40, and includes normally opened contacts 50 and normally closed contacts 52.

A first energy storage capacitor 54 is connected in parallel with the energy source capacitor 40 through the normally open contacts 50 and a second energy storage capacitor 57 is connected in parallel with the first energy storage capacitor 54 through the normally closed contacts 52. The parallel combination of a discharge circuit 56 and the operating coil of switch opening relay 58 is connected in series with the second energy storage capacitor 57. An adjustable leakage resistor 60 is connected in shunt with the second energy storage capacitor 57.

The sectionalizing switch 18 also includes a trip coil 62 which is connected in parallel with the energy source capacitor 40 through the normally open contacts 64 of relay 58. Energization of trip coil 62 will move a magnetic plunger 65 to the left, thereby opening the main switch 66 of sectionalizer switch 18.

While any suitable low voltage discharge means may be utilized in the instant invention, discharge circuit 56 in the illustrated embodiment comprises a PNP transistor 70, NPN transistor 72 and a Zener diode 74. The emitter of transistor 70 is connected through a resistor 76 to its base and to the collector of transistor 72. Similarly, the emitter of transistor 72 is connected through resistor 78 to its base and to the collector of transistor 70. Zener diode 74 is connected between the bases of transistor 70 and 72. The breakdown potential of this discharge circuit will be equal to the breakdown potential of Zener diode 74. In operation, when the voltage between the negative terminal of capacitor 57 and the grounded terminal of discharge circuit 56 exceeds the breakdown potential of Zener diode 74, current flows through the path defined by resistor 76, Zener diode 74 and resistor 78. This will lower the potential of the base of transistor 70 below its emitter potential and will raise the base potential of transistor 72 above that of its emitter, whereupon each of the transistors 70 and 72 will begin conducting. This current flow will continue as long as this difference in potential exists.

Assume, for the sake of illustration, that a fault occurs in feeder line 14. This will result in an increased rectified current in the operating coil of relay 48 causing it to close its normally open contacts 50 and open its normally closed contacts 52. This connects the first energy storage capacitor 54 to the energy source capacitor 40, so that a portion of the charge on capacitor 40 is redistributed on capacitor 54. The magnitude of this portion of the charge will, of course, be determined by the relative sizes of the capacitors and the initial charge on each. Because the opening of circuit breaker 16 is time delayed, sufficient time is available for capacitor 54 to charge up until the voltage across it and capacitor 40 are equal. This fault current will also cause the operation of trip coil 20 of recloser 16, after a time delay, thereby opening the main switch 26 to interrupt the circuit in the main distribution line 12 and in the feeder lines 14, 14' and 14". When the main contacts 26 of repeating circuit interrupter 16 open, relay 48 drops out, opening contacts 50 to isolate capacitor 54 from capacitor 40 and closing contacts 52 to connect capacitors 54 and 57. The closing of contacts 52 also places a voltage across discharge circuit 56 which is equal to the difference between the voltages across capacitor 54 and capacitor 57. Upon the initial operation of the device the charge on capacitor 57 will be substantially zero so that this difference in potential will be substantially the entire voltage across capacitor 54. As a result, the voltage drop across discharge circuit 56 will be sufficient to cause it to conduct, thereby completing the charging circuit between capacitors 54 and 57. Little current will flow, however, through the operating coil of relay 58 because it presents a very high impedance path to instantaneous current flow. Resistor 55 is provided in series with capacitor 54 to limit the inrush current during the charging and discharging thereof.

Should the fault in feeder line 14 clear while main contacts 26 of repeating circuit interrupter 16 are open, they will remain closed upon subsequent reclosure. The charge on capacitors 54 and 57 will then slowly leak off through a path defined by adjustable resistor 60 and operating coil of relay 58. The rate of this leakage will be governed by the adjustment of resistor 60.

On the other hand, should the fault in feeder line 14 persist, upon the reclosing of main contacts 26 of circuit breaker 16, relay 48 will again pull in, closing contacts 50 and opening contacts 52. Once again some of the charge on capacitor 40 will flow to capacitor 54 until the voltage across the two is again equal. Assuming that the fault persists, main contacts 26 will again reopen causing relay 48 to drop out thereby again open circuiting capacitors 40 and 54 and connecting capacitors 54 and 57. The instantaneous voltage across discharge circuit 56 will again be equal to the difference between the voltages across capacitors 54 and 57. If it is desired to have the sectionalizer switch open after two operations of the reclosing circuit breaker 16, the parameters of the integrating circuit are so chosen that the instantaneous voltage across discharge circuit 56 will then be below its breakdown potential. In this event, the charge flowing to capacitor 57 is forced through the operating coil of relay 58 causing it to close contacts 64, thereby connecting the trip coil 62 of the sectionalizer switch 18 in parallel with capacitor 40. The resulting discharge current from capacitor 40 actuates the electromagnetic trip plunger 65 to open the main switch 66. Because the sectionalizer switch 18 does not have interrupting capacity, the opening of the main switch 66 occurs while the main interrupting contacts 26, of reclosing circuit breaker 16, are open.

The opening of main switch 66 isolates the fault in feeder line 14 so that upon the subsequent reclosing of the main contacts 26, of circuit breaker 16, current conditions in the system will have returned to normal so that contacts 26 will not be reopened and continuous service will be resumed in the main line 12 and in the other feeder lines 14′ and 14″. It can be seen, that because sectionalizer switch 18 is operative only upon the occurrence of a fault in feeder line 14, the main switch 66 will remain closed should a permanent fault occur in the main distribution line 12 or in one of the other feeder lines 14′ or 14″. As a result, should a permanent fault appear in the main line 12 or in one of the other feeder lines 14′ or 14″, service will be restored in feeder line 14 as soon as the fault in the main line 12 is cleared or as soon as the fault in the other feeder line is isolated.

While only a single embodiment of the invention is shown or described, other modifications thereof will become obvious to a man skilled in the art from this disclosure. Accordingly, it is intended in the appended claims to cover all modifications that fall within the true spirit of the invention.

I claim:

1. In a protective device having switch means disposed in an electrical circuit, the combination of, first and second electrical energy storage means and an electrical energy source, condition responsive means connected to said system and operable each time a predetermined circuit condition occurs to couple said first energy storage means to said energy source and thereby transfer a predetermined quantity of energy from said source to said energy storage means, said condition responsive means being operable upon the disappearance of said circuit condition to uncouple said first energy storage means from said energy source and to couple said first energy storage means to said second energy storage means so that a predetermined portion of the energy upon said first energy storage means is transferred to said second energy storage means, and means connected to said second energy storage means for opening said switch means when energy on said second energy storage means exceeds a predetermined value.

2. In a protective device having switch means disposed in an electrical circuit, the combination of, first and second capacitor means, a source of electrical energy, overload responsive means connected to said electrical circuit and operable upon the occurrence of an overload therein to couple said first capacitor means to said energy source to affect the transfer of energy therebetween, said overload responsive means being operable upon the disappearance of said circuit condition to uncouple said first capacitor means from said source and to couple said first and second capacitor means to thereby affect the transfer of energy therebetween, and means connected to said second capacitor means for opening said switch means when the charge stored thereon equals a predetermined value.

3. In a protective device having switch means disposed in an electrical circuit, the combination of, first and second capacitor means, a source of electrical energy, overload responsive means connected to said electrical circuit for transferring a first predetermined quantity of charge from said energy source to said first capacitor means each time an overload condition occurs in said circuit and for transferring a second predetermined quantity of charge from said first capacitor means to said second capacitor means each time said overload condition disappears, said second predetermined quantity being independent of the magnitude of said overload and means connected to said second capacitor means for opening said switch means when the charge stored thereon exceeds a predetermined value.

4. In a protective device having switch means disposed in an electrical circuit, the combination of, first and second electrical energy storage means and an electrical energy source, condition responsive means connected to said system and operable each time a predetermined circuit condition occurs to transfer a predetermined quantity of energy from said energy source to said first energy storage means, said condition responsive means also being operable to transfer a predetermined portion of the energy from said first energy storage means to said second energy storage means each time said circuit condition disappears, said portion being controlled by the difference in the energy levels therebetween, and means connected to said first and second energy storage means for opening said switch means when the energy on said second energy storage means exceeds a predetermined value.

5. In a switch device having switch means disposed in an electrical circuit, the combination of, first and second capacitor means, a source of electrical energy, condition responsive means connected to said system and operable each time a predetermined circuit condition occurs to transfer a quantity of charge from said energy source to said first capacitor means, said quantity being controlled by the amount of charge previously stored on said first capacitor means, said condition responsive also being operable to transfer a portion of the total charge from the first capacitor means to said second capacitor means each time said circuit condition disappears, said portion being controlled by the difference in the voltage therebetween, means connected to said first and second capacitor means for opening said switch means when the difference in the voltage between said first and second capacitor means falls below a predetermined value and leakage means in circuit with said first and second capacitor means for draining the charge therefrom if the number of operations of said condition responsive means is insufficient to cause the opening of said switch means.

6. In a switch device having switch means disposed in an electrical circuit, the combination of, first and second capacitor means, a source of electrical energy, relay means connected to said system and operable each time a predetermined circuit condition occurs to connect said first capacitor means to said energy source so that a quantity of charge is transferred thereto, said relay means also being operable to connect said first and second capacitor means each time said circuit condition disappears so that a portion of the charge on said first capacitor means flows to said second capacitor means, said portion being controlled by the difference in the voltage on each of said capacitor means, and means connected to said first and second capacitor means for opening said switch means when the difference between said voltages falls below a predetermined value.

7. In a switch device having switch means disposed in an electrical circuit, the combination of, first and second capacitor means, a source of electrical energy, relay means connected to said system and operable each time a predetermined circuit condition occurs to connect said first capacitor means to said energy source so that a quantity of charge is transferred thereto, said relay means also being operable to connect said first and second capacitor means each time said circuit condition disappears so that a portion of the charge on said first capacitor means flows to the second, and voltage responsive means connected to said first and second capacitor means for completing the charging circuit therebetween when the difference in their voltages exceeds its operating potential, and electro-responsive switch opening means shunting said voltage responsive means, the flow of energy to said second capacitor means flowing through said electro-responsive means to open said switch means when the energy stored on said energy storage means falls below said operating potential following a predetermined number of occurrences of said circuit condition.

8. Control means for use in an electrical system, the combination of, a source of energy, first and second energy storage means, relay means having normally open contacts in circuit between said first energy storage means and said source of energy and normally closed contacts in circuit between said first and second energy storage means, voltage responsive means in series with said second energy storage means, electro-responsive actuating means shunting said voltage responsive means, said relay means being coupled to said system and operable upon the occurrence of a predetermined condition therein for operating said contacts to their alternate positions so that said first energy storage means is connected to said energy source for charging and is disconnected from said second energy storage means, said relay means also being operable upon the disappearance of said condition to move said contacts to their normal positions so that a portion of the energy on said first energy storage means flows to said second energy storage means, said voltage responsive means being operative to complete the charging circuit between said first and second energy storage means when the difference in the energy stored on said first and second energy storage means exceeds its discharge potential, the charging energy for said second energy storage means flowing through said electro-responsive actuating means to cause actuation thereof when said discharge potential is not exceeded following a predetermined number of successive operations.

9. Control means for use in an electrical system, the combination of, a first capacitor means connected to said system for charging by the current flowing therein, a second and a third capacitor means, relay means having normally open contacts in circuit between said first and second capacitor means and normally closed contacts in circuit between said second and third capacitor means, discharge means in series with said third capacitor means, electro-magnetic operating means shunting said discharge means, said relay means being coupled to said system and operable upon the occurrence of an overcurrent therein to operate said contacts to their alternate positions thereby connecting said first and second capacitor means so that the charge on the former is redistributed between the two and to disconnect said second and third capacitor means, said relay means also being operable upon the disappearance of said overcurrent to move said contacts to their normal positions thereby connecting said second and third capacitors so that a portion of the charge on said second capacitor means flows to said third capacitor means, said discharge means operating to complete the charging circuit to said first energy storage means when the difference in the voltages across said second and third capacitor means exceeds its discharge potential, the charge for said third capacitor means flowing through said electro-magnetic operating means to cause actuation thereof when said discharge potential of said discharge means is not exceeded following a predetermined number of successive operations.

10. In a protective device having switch means in circuit with an electrical system, the combination of, first and second electrical energy storage means, an electrical energy source, condition responsive means connected to said system and operable upon the occurrence of a predetermined overload in said system to transfer a predetermined quantity of energy from said source to said first energy storage means, said predetermined quantity being independent of the magnitude of said overload, said condition responsive means also being operable to transfer a predetermined portion of the energy stored on said first energy storage means to said second energy storage means each time said overload condition disappears, and means connected to said first and second energy storage means for opening said switch means when the energy on said second energy storage means exceeds a predetermined value.

11. In a device for protecting an electrical system, the combination of, switch means in circuit with said system, first and second energy storage means, a source of electrical energy, overload responsive means connected to said system and operable each time a predetermined overload occurs therein to connect said first energy storage means to said energy source so that a predetermined quantity of energy is transferred thereto, said overload responsive means also being operable to disconnect said first energy storage means and said energy source and to connect said first and second energy storage means each time said overload disappears so that a predetermined portion of the energy on said first energy storage means flows to the second, voltage responsive means in series with said second energy storage means for completing the charging circuit thereto when the difference in the voltage across said first and second energy storage means exceeds a predetermined value, and electroresponsive switch opening means shunting said voltage responsive means, the flow of energy to said second energy storage means flowing through said electroresponsive means to open said switch means when the difference in said voltages falls below said predetermined value following a pre-selected number of occurrences of said overload.

12. In a protective device having switch means in circuit with an electrical system, overload responsive means connected to said system and operable upon each occurrence of an overload therein to produce a first electrical energy signal, first electrical energy signal storage means coupled to said overload responsive means for receiving said first electrical energy signal, second electrical energy signal storage means, said overload responsive means being operable upon each disappearance of said overload to couple said first and second energy storage means, said first and second energy storage means being operable in response to said first electrical energy signal and upon being coupled to produce one of the series of electrical energy signals having progressively varying magnitudes, electrical signal means connected to said second electrical energy signal storage means and operable to open said switch means upon the receipt of an electrical energy signal having a predetermined magnitude, so that said switch means will be opened after a predetermined number of signals from said second electrical energy signal storage means.

13. In a protective device having switch means in circuit with an electrical system, overload responsive means connected to said system and operable upon each occurrence of an overload therein to produce a first electrical energy signal, first electrical energy signal storage means coupled to said overload responsive means for receiving said first electrical energy signal, second electrical energy signal storage means, said overload responsive means being operable upon each disappearance of said overload to couple said first and second electrical energy storage means, said first and second electrical energy storage means being operable in response to said first electrical energy signal and upon being coupled to produce one of a series of electrical energy signals having progressively decreasing magnitudes, electrical energy signal responsive means connected to said second energy signal storage means and operable to open said switch means upon the receipt of an electrical energy signal having less than a predetermined magnitude, so that said switch means will be opened after a predetermined number of electrical energy signals from said second energy signal storage means.

14. In a protective device having switch means in circuit with an electrical system, overload responsive means connected to said system and operable upon each occurrence of an overload therein to produce a first electrical signal, circuit means coupled to said overload responsive means for receiving said first electrical signals, signal memory means coupled to said circuit means and to said overload responsive means, said signal memory means and said circuit means being operable upon the disappearance of said overload and subsequent to the receipt of one of said electrical signals to produce one of a series of voltage impulses of progressively decreasing magnitude, discharge means connected to said circuit means and operable to discharge voltage impulses having at least a predetermined magnitude, and voltage responsive switch opening means connected to said circuit means and operable by said voltage impulses when the magnitude thereof is insufficient to operate said discharge means.

15. In a protective device having switch means disposed in an electrical system, the combination of, an electrical energy source, first and second electrical energy signal means, abnormal condition responsive means operable upon the appearance of an abnormal circuit condition to couple said first signal means to said energy source for receiving an electrical energy signal, said overload responsive means also being operable upon the disappearance of said circuit condition to uncouple said first signal means from said energy source and to couple said first and second signal means, said first and second signal means being operable in response to an energy signal and upon being coupled to produce one of a series of electrical signals after each of a predetermined number of coupling operations and another electrical signal upon the next succeeding coupling operation after said predetermined number, switch opening means, first circuit means connected to said second signal means and normally operable upon the occurrence of an electrical signal to actuate said switch opening means, and second circuit means connected to said second signal means and to said first circuit means and being responsive to each of said series of electrical signals to render said second circuit means inoperable, said second circuit means being non-responsive to said another electrical signal so that said first circuit means is operable to open said switch means upon the occurrence of said another electrical signal.

16. In a protective device having switch means disposed in an electrical system, the combination of, an electrical energy source, first and second electrical energy signal means, overload responsive means coupled to said system and operable upon the appearance of an abnormal circuit condition to couple said first signal means to said source to receive an energy signal, said overload responsive means also being operable upon the disappearance of said circuit condition to uncouple said first signal means from said source and to couple said first and second signal means, said first and second signal means being operable in response to an energy signal and upon being coupled to produce an electrical signal having at least a predetermined magnitude upon each of a predetermined number of coupling operations and another electrical signal having less than said predetermined magnitude upon the next succeeding coupling operation of said first and second signal means after said number, switch opening means, first circuit means connected to first and second said signal means and normally operable upon the occurrence of an electrical signal to actuate said switch opening means, and discharge circuit means connected to said second signal means and to said first circuit means and being responsive to an electrical signal of at least said predetermined magnitude to render said first circuit means inoperable, said discharge circuit means being non-responsive to electrical signals of less than said predetermined magnitude so that said first circuit means is operable to actuate said switch opening means upon the occurrence of said another electrical signal.

References Cited in the file of this patent

UNITED STATES PATENTS

| | | |
|---|---|---|
| 2,185,825 | Anderson | Jan. 2, 1940 |
| 2,210,669 | Johnson | Aug. 6, 1940 |
| 2,264,712 | Reagan | Dec. 2, 1941 |
| 2,342,821 | Reagan | Feb. 29, 1944 |
| 2,387,372 | Watkins et al. | Oct. 23, 1945 |
| 2,473,344 | McCown | June 14, 1949 |
| 2,815,445 | Yucht | Dec. 3, 1957 |
| 2,925,535 | Titze | Feb. 16, 1960 |
| 2,972,709 | Chabala | Feb. 21, 1961 |